Figure 1:
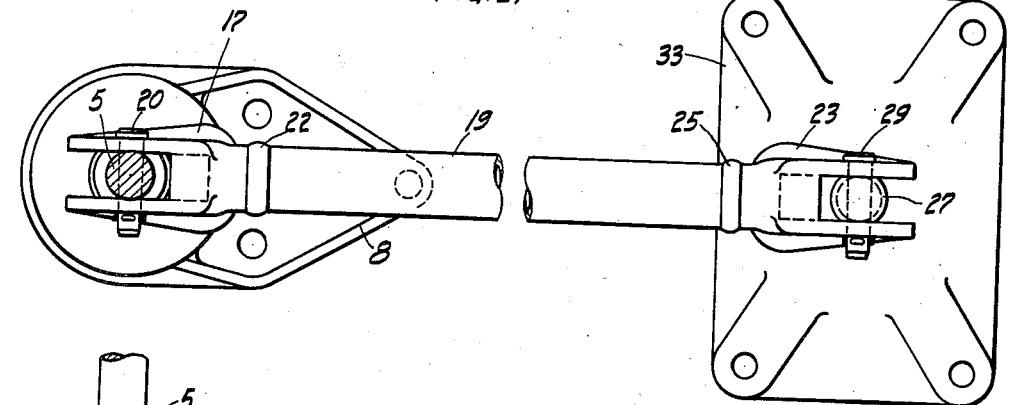

June 25, 1940.     L. A. BIXBY     2,205,589
GEAR SHIFTING MEANS
Filed March 15, 1939

INVENTOR.
LEO A. BIXBY.
BY Walter E. Schirmer
ATTORNEY.

Patented June 25, 1940

2,205,589

UNITED STATES PATENT OFFICE 2,205,589

GEAR SHIFTING MEANS

Leo A. Bixby, Berrien Springs, Mich., assignor to Clark Equipment Company, Buchanan, Mich., a corporation of Michigan Application March 15, 1939, Serial No. 261,877

4 Claims. (Cl. 74—473)

This invention relates to gear shifting means, whereby proper shifting motion can be transmitted from a gear shift lever to a remotely disposed transmission or change speed gear mechanism in a relatively simple and economical manner.

In motor trucks and busses the body designs have been varied in recent years so that for certain types of construction the transmission is located at a point remote from the operator's compartment. This necessitates providing some sort of remote control mechanism whereby the operator can control the shifting of the transmission from within his compartment without a direct connection between the shift lever and the shift rails. This is especially true in rear engine drive constructions, cab-over engine trucks, and similar vehicles.

One of the primary objects of the present invention is to provide a construction which utilizes only one motion transmitting member between the gear shift lever and the transmission case, and which utilizes substantially the same type of pedestal mounting and gear shift lever that is used in a conventional transmission.

Another feature of the present invention is the utilization of a motion transmitting rod which is capable of transmitting both rocking movement in a lateral direction to effect selection of the shift rail at the remotely disposed transmission, and also longitudinal movement to produce the desired shifting action for engaging the selected gears.

Among the features of the invention is the employment of a gear shift lever having slabbed off parallel side portions intermediate its ends, which are engaged by a suitable fork or clevis shaped bracket on the end of the motion transmitting rod, the bracket having arcuate wing portions engaging the flattened sides of the lever to control its movement very closely in accordance with the movement produced at the operator's end of the mechanism.

Other objects and advantages of the present invention will appear more fully from the following detailed description which, taken in conjunction with the accompanying drawing, will disclose to those skilled in the art the particular construction and operation of a preferred form of the present invention.

Figure 2:
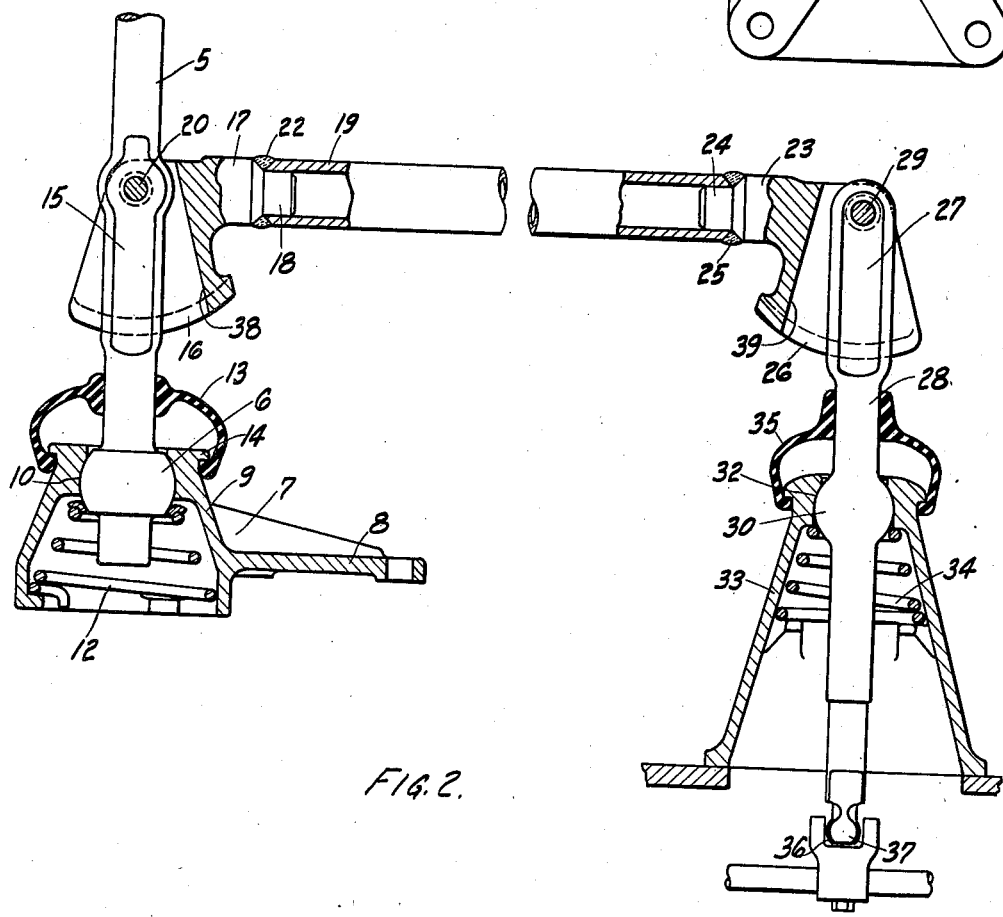

In the drawing:

Figure 1 is a top plan view, partly in section, of a preferred form of the invention; and Figure 2 is an elevational sectional view of the mechanism shown in Figure 1.

Considering the drawing in detail, there is provided a gear shift lever 5 adapted to extend into the operator's compartment and having adjacent its lower end a ball portion 6 universally supported in a supporting bracket indicated generally at 7.

The bracket 7 has an extending portion 8 which is adapted to be bolted or otherwise suitably secured to a structural part of the vehicle frame or body to provide a rigid support for the bearing portion 9 which includes the spherical seat 10 in which the ball portion 6 of the lever is located by means of a coil spring member 12 disposed within the supporting portion 9 and bearing against the lever in such manner as to force it against the spherical seat 10. A suitable flexible closure cap 13 embraces the lever immediately above the ball portion, and has a peripheral edge which is snapped over the flanged end 14 of the bearing or support portion 9.

Intermediate its ends the lever 5 is provided with slabbed off side portions indicated generally at 15 to provide parallel planar surfaces adapted to be received within and engaged by the wing portions 16 of a bracket member 17 which has the extending stud portion 18 projecting into one end of a motion transmitting tube or rod 19.

The wing portions 16 of the bracket 17 are arcuate in shape so as to accommodate angular movement of the lever 5 when rotating about the transversely extending pin 20 which secures the bracket 17 to the lever. It will be noted that with this construction the lever cannot rotate with respect to the bracket 17, and any lateral rocking of the lever 5 about its ball support in the bracket 7 will result in a similar rocking of the bracket 17.

This bracket is welded or otherwise suitably secured as indicated at 22 to the end of the rod 19 so that rocking of the bracket 17 results in a rotational thrust on the rod 19 in accordance with the lateral rocking of the lever 5.

At its opposite end the rod 19 receives a second bracket member 23 having the projecting stud 24 centering the same in the end of the rod and secured thereto by means of welding or the like, as indicated at 25. The bracket 23 is also provided with arcuate parallel wing portions 26 which are spaced apart a distance sufficient to receive the flattened portion 27 of the lever 28 which is secured thereto by the transversely extending pin 29.

The lever 28 has a ball portion 30 intermediate its ends which is seated in a suitable spherical seat 32 formed in the pedestal support 33 mounted on top of a transmission case, the pedestal 33 being flanged as indicated in Figure 1 at its base to receive suitable mounting screws or the like. A suitable spring 34 encircles the lower end of the rod and is biased within the pedestal 33 to bear against the ball portion 30 of the rod for maintaining it in the seat 32. A closure cap 35 similar to the cap 13 encloses the upper end of the pedestal and engages about the lateral surface of the rod 28.

The lower end of the rod 28 is provided with a ball portion 36 having the slabbed off sides 37 adapted to engage in the respective collars of the shift rails disposed within the transmission upon which the pedestal 33 is mounted. It will be apparent that upon a rotative motion being imparted to the rod 19 due to lateral rocking of the lever 5 that this movement or lateral rocking of the lever 5 will be imparted to the lever 28 to rock the same about its seat 32, thereby moving the ball 33 at the lower end thereof selectively into engagement with the shift brackets on the shift rails. Similarly, a fore and aft movement of the lever 5 rotating the lever about the seat 10 will, through the pins 20 and 29 and the rod 19, result in a corresponding fore and aft movement of the lever 28 about its seat 32 thereby producing longitudinal movement of the selected shift rail to effect the shifting of the gears in the transmission. By reason of the arcuate shape of the wing portions 16 and 26 of the brackets 17 and 23, respectively, this fore and aft movement can be accommodated within the limits of the shifting movement, suitable stop surfaces 38 and 39 on the respective brackets limiting this fore and aft movement.

Also, by reason of the fact that the parallel facing surfaces of the wings of the brackets engage corresponding parallel lateral surfaces on the levers, the rotational movement of the rod 19 due to lateral rocking of the lever 5 will produce a corresponding lateral rocking movement of the lever 28, the amount of this movement being equal providing the distances between the transverse pins and the ball seats of the lever 5 and the lever 28 are the same.

The brackets 17 and 23 are identical in form and are mounted in the rod 19 in the same manner, the rod 19 being merely a rigid tube or the like. Consequently, the parts forming the motion transmitting mechanism are very simple and economical to manufacture, and can be readily assembled to the two levers by means of the cross pins 20 and 29. This is of distinct advantage in facilitating the assembly of the construction and insures that the conventional type of shifting movement of the shift lever 5 will produce a corresponding selecting and gear changing movement of the lever 28 so that the operator need learn no new routine for shifting the transmission controlled by the lever 28.

I am aware that various changes may be made in certain details of the construction herein illustrated and described, and I therefore do not intend to be limited except as defined by the scope and spirit of the appended claims.

I claim:

1. In combination, a shift lever having universal support adjacent one end and a flattened intermediate portion, a motion transmitting rod, a second lever having universal support intermediate its ends and having a shift rail engaging portion at one end and a flattened portion on the opposite side of said support, brackets secured to the ends of said rod and having parallel arcuate wing portions respectively engaging the flattened portions of said levers, and transverse pin means connecting each lever to the adjacent bracket whereby lateral rocking of one lever rocks said rod and the other lever a corresponding amount and fore and aft movement of one lever is transmitted by said pin means and rod to the other lever, said wing portions having transverse webs limiting fore and aft movement of said levers.

2. In combination, a first universally supported lever, a second universally supported lever, longitudinally extending flattened portions on both levers, a rod therebetween, brackets on opposite ends of said rod, each bracket having parallel wing portions closely receiving the flattened portions of the adjacent levers and of sector formation to embrace said flattened portions throughout the range of movement of said levers, and means pivotally securing said brackets to said levers in such manner that lateral rocking and fore and aft movements of one lever effect corresponding movements of the other lever.

3. In combination, a pair of spaced levers having universal support and having longitudinally extending flattened portions, a rod extending between said levers, brackets secured to the opposite ends of said rod and having normally extending bifurcated wing portions extending longitudinally of the levers and closely embracing the flattened portions of said levers, and transverse pins through said flattened portions and bifurcated portions pivotally connecting said levers together through said rod, said wing portions being of sector shape with the apices thereof adjacent said pin means.

4. The combination of claim 3 further characterized in the provision of oppositely angled transverse web means on said bifurcated portions engageable with said levers for limiting conjoint movement of said levers both fore and aft.

LEO A. BIXBY.